United States Patent [19]

Wilcox et al.

[11] Patent Number: 5,199,077
[45] Date of Patent: Mar. 30, 1993

[54] WORDSPOTTING FOR VOICE EDITING AND INDEXING

[75] Inventors: Lynn D. Wilcox, Portola Valley; Marcia A. Bush, Belmont, both of Calif.

[73] Assignee: Xerox Corporation, Stamford, Conn.

[21] Appl. No.: 762,290

[22] Filed: Sep. 19, 1991

[51] Int. Cl.$^5$ ............................ G10L 5/06; G10L 5/00
[52] U.S. Cl. ........................................ 381/43; 381/41; 381/42
[58] Field of Search ..................................... 381/41-43

[56] References Cited

U.S. PATENT DOCUMENTS

| | | | |
|---|---|---|---|
| 4,481,593 | 11/1984 | Bahler | 381/43 |
| 4,489,435 | 12/1984 | Moshier | 381/43 |
| 4,587,670 | 5/1986 | Levinson et al. | 381/43 |
| 4,759,068 | 7/1988 | Bahl et al. | 381/43 |
| 4,827,521 | 5/1989 | Bahl et al. | 381/43 |
| 4,837,831 | 6/1989 | Gillick et al. | 381/43 |
| 4,903,305 | 2/1990 | Gillick et al. | 381/41 |
| 4,977,599 | 12/1990 | Bahl et al. | 381/43 |
| 5,023,911 | 6/1991 | Gerson | 381/43 |

OTHER PUBLICATIONS

R. C. Rose, E. I. Chang, R. P. Lippman, "Techniques for Information Retrieval from Voice Messages", Proc.: Int. Conf. Acoustics, Speech and Signal Processing Toronto, Canada, May 1991, pp. 317-320.
Tishby, Naftali Z., "On the Application Mixture AR Hidden Markov Models to Text Independent Speaker Recognition". IEEE Transactions on Signal Processing, vol. 39, No. 3, Mar. 1991, pp. 563-570.
L. R. Bahl, P. F. Brown, P. V. de Souza, R. L. Mercer, M. A. Picheny, "Acoustic Markov Models Used in the Tangora Speech Recognition System". Proc. of the Int. Conf. on Acoustics, Speech and Signal Processing, New York, New York, Apr. 1988, pp. 497-500.
J. C. Bezdek, J. C. Dunn, "Optical Fuzzy Partitions: A Heuristic for Estimating the Parameters in a Mixture of Normal Distributions". IEEE Trans. on Computers, Aug. 1975, pp. 835-838.
R. M. Gray, "Vector Quantization", IEEE ASSP Magazine, Apr. 1984, pp. 4-29.
F. Jelinek, "Continuous Speech Recognition by Statistical Methods". Proc. of the IEEE, vol. 64, No. 4, Apr. 1976, pp. 532-556.
L. R. Rabiner, "A Tutorial on Hidden Markov Models and Selected Applications in Speech Recognition". Proc. of the IEEE, vol. 77, No. 2, Feb. 1989, pp. 257-285.
J. R. Rohlicek, W. Russel, S. Roukos, H. Gish, "Continuous Hidden Markov Modeling for Speaker-Independent Word Spotting". Proc. of the Int. Conf. on Acoustics, Speech and Signal Processing, Glasgow, Scotland, May 1989, pp. 627-630.
R. C. Rose, D. B. Paul, "A Hidden Markov Model Based Keyword Recognition System". Proc. of the Int. Conf. on Acoustics, Speech and Signal Processing, Apr. 1990, pp. 129-132.
J. G. Wilpon, L. R. Rabiner, C. H. Lee, E. R. Goldman, "Automatic Recognition of Keywords in Unconstrained Speech Using Hidden Markov Models". IEEE Trans. on Acoustics, Speech and Signal Processing, vol. 38, No. 11, Nov. 1990, pp. 1870-1878.

*Primary Examiner*—Emanuel S. Kemeny
*Assistant Examiner*—Kee M. Tung

[57] ABSTRACT

A technique for wordspotting based on hidden Markov models (HMM's). The technique allows a speaker to specify keywords dynamically and to train the associated HMM's via a single repetition of a keyword. Non-keyword speech is modeled using an HMM trained from a prerecorded sample of continuous speech. The wordspotter is intended for interactive applications, such as the editing of voice mail or mixed-media documents, and for keyword indexing in single-speaker audio or video recordings.

19 Claims, 8 Drawing Sheets

FIG. 5
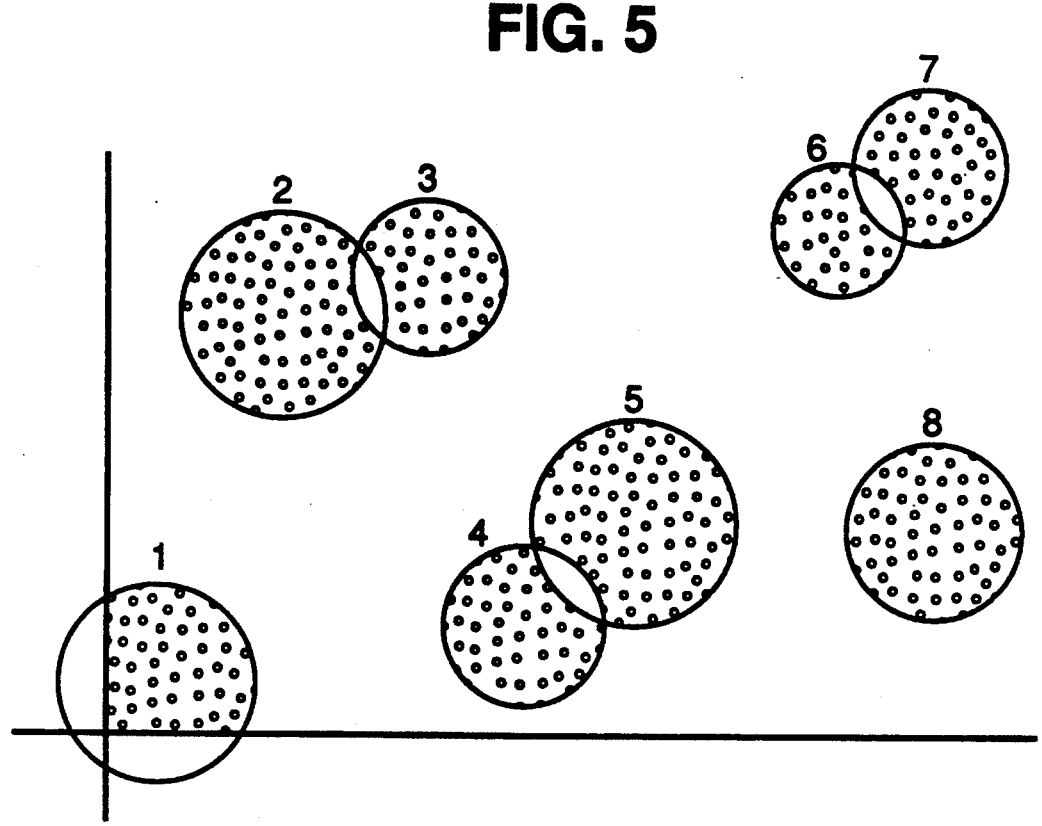
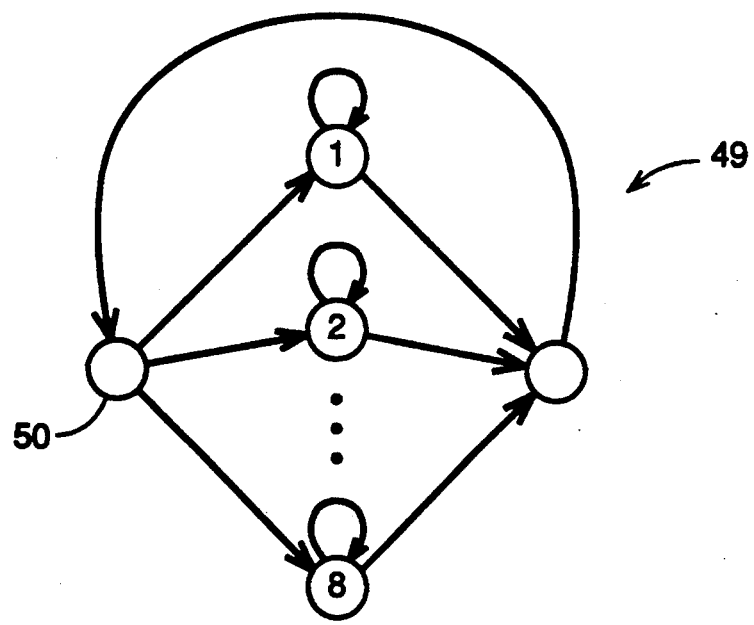
FIG. 6

FIG. 7
4443333336666666
FIG. 10
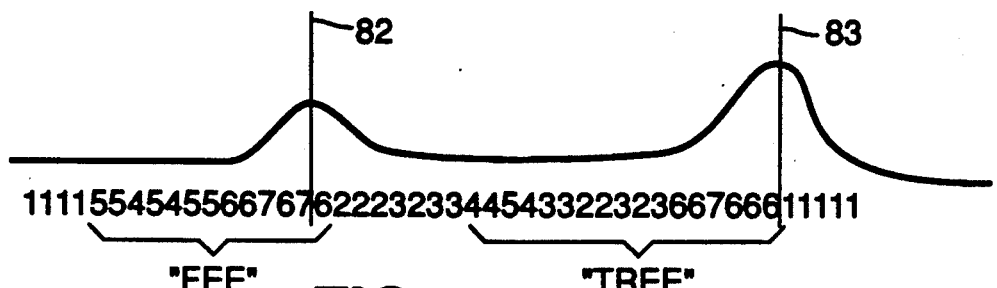
FIG. 11
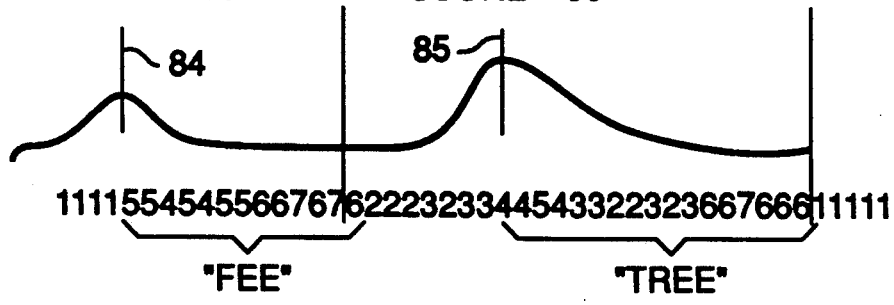
FIG. 12

FIG. 8
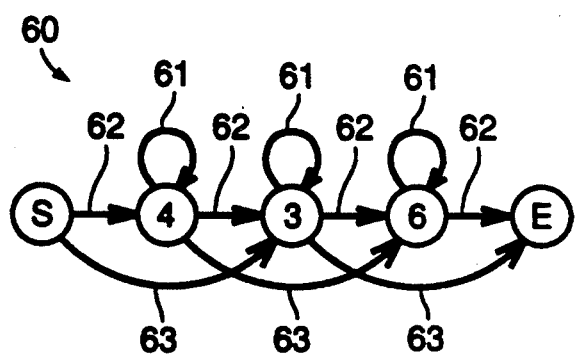
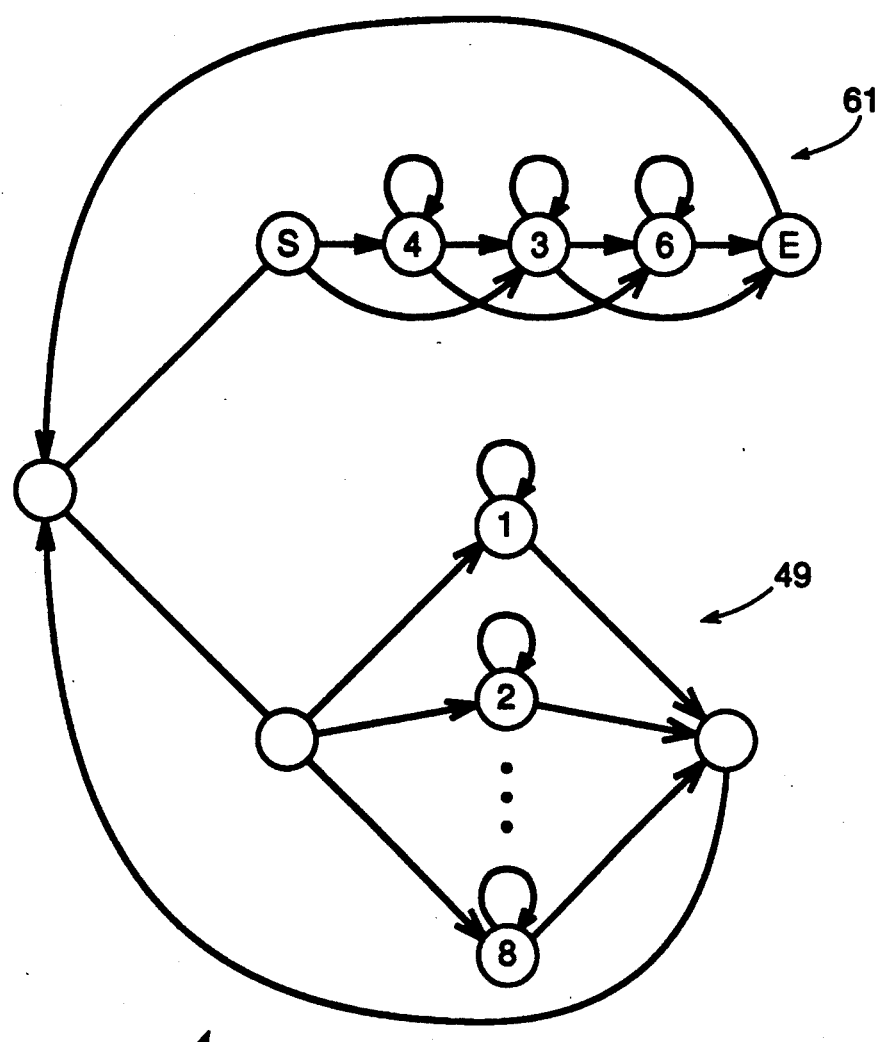
FIG. 9

WORDSPOTTING FOR VOICE EDITING AND INDEXING

This invention relates to speech-recognition systems, and in particular to a system for wordspotting based on hidden Markov models (HMMs).

BACKGROUND OF INVENTION

Speech recognition is the ability of a computer controlled system to recognize speech. Wordspotting is an application of speech recognition technology that enables the location of keywords or phrases in the context of fluent speech.

The use of HMMs in wordspotting in speech recognition applications is well known in the art. See, for example:

J. R. Rohlicek, W. Russel, S. Roukos, H. Gish, "Continuous Hidden Markov Modeling for Speaker-Independent Word Spotting". Proc. of the Int. Conf. Acoustics, Speech and Signal Processing, Glasgow, Scotland, May 1989, pp. 627-630;

R. C. Rose, D. B. Paul, "A Hidden Markov Model Based Keyword Recognition System". Proc. of the Int. Conf. on Acoustics, Speech and Signal Processing, April 1990, pp. 129-132;

J. G. Wilpon, L. R. Rabiner, C. H. Lee, E. R. Goldman, "Automatic Recognition of Keywords in Unconstrained Speech Using Hidden Markov Models". IEEE Trans. on Acoustics, Speech and Signal Processing, Vol. 38, No. 11, November 1990, pp. 1870-1878;

L. R. Bahl, P. F. Brown, P. V. de Souza, R. L. Mercer, M. A. Picheny, "Acoustic Markov Models Used in the Tangora Speech Recognition System". Proc. of the Int. Conf. on Acoustics, Speech and Signal Processing, New York, N.Y., April 1988, pp. 497-500;

J. G. Wilpon, C. H. Lee and L. R. Rabiner, "Application of Hidden Markov Models for Recognition of a Limited Set of Words in Unconstrained Speech", Proceedings of the International Conference on Acoustics, Speech and Signal Processing, Vol. 1, pp. 254-257, Glasgow, Scotland, May 1989; the contents of all of the preceding papers being incorporated herein by reference.

The system of the invention involves using HMMs to model speaker utterances. Hidden Markov models consists of a set of states with associated outputs, where the output of a state is a feature vector describing a sound. Transition probabilities between states allow modeling a sequence of sounds. In this invention, the states for the HMMs correspond to clusters of sounds, or acoustic units. A keyword is modelled as a specific sequence of states, or acoustic units. Nonkeyword speech is modelled as an arbitrary sequence of these units.

Previous speaker-dependent wordspotting systems have been based on template matching using dynamic time warping, as described in the following papers:

R. W. Christiansen, C. K. Rushforth, "Detecting and Locating Key Words in Continuous Speech Using Linear Predictive Coding". IEEE Trans. on Acoustics, Speech and Signal Processing, Vol. ASSP-25, No. 5, October 1977, pp. 361-367;

A. L. Higgens, R. E. Wohlford, "Keyword Recognition Using Template Concatenation". Proc. of the Int. Conf. on Acoustics, Speech and Signal Processing, Tampa, Fla., March 1985, pp. 1233-1236;

C. S. Myers, L. R. Rabiner, A. E. Rosenberg, "An Investigation of the Use of Dynamic Time Warping for Word Spotting and Connected Speech Recognition". Proc. of the Int. Conf. on Acoustics, Speech and Signal Processing, Denver, Colo., April 1980, pp. 173-177.

While these techniques are applicable to wordspotting tasks, they are generally inferior to HMM's in modeling the acoustic variability associated with multiple repetitions of a keyword due to speaking rate, context, etc. HMM's also provide a more natural means of modeling non-keyword speech than do the filler templates used in the more sophisticated DTW-based systems. See the March 1985 Higgens et al paper.

SUMMARY OF INVENTION

An object of the invention is a method and system for spotting a keyword spoken by a talker in previously recorded speech by the same talker.

A further object of the invention is to spot keywords in previously recorded speech for voice editing and indexing purposes.

Still another object of the invention is a keyword spotter primarily requiring only a single utterance of the keyword for training.

Another object is to spot a keyword spoken by a user in previously recorded speech by another talker where both talkers are known.

The wordspotting technique described here uses an HMM to model arbitrary, user-defined keywords in the context of continuous speech. Training the HHM consists of two stages; an initial, static stage in which statistics for a given talker are learned and a model for the background speech is obtained, as described in the Rose et al, April 1990 paper, and a second, dynamic stage in which keyword training is performed as the system is in use. Data for the static training stage consists of an arbitrary segment of the talker's speech. The dynamic training stage is novel in that it requires primarily only a single repetition of a keyword; thus, there is no distinction between keyword training and wordspotting. The method for creating the keyword HMM from the training utterance has some similarities to that used in constructing fenonic baseforms as described in the April 1988 Bahl et al paper. Model training is described in more detail below.

The search technique for locating instances of a keyword in continuous speech is a "forward-backward" search which, as described in the Rohlicek et al May 1989 paper, uses peaks in the posteriorari probability of the keyword endstate to detect potential keyword endpoints. Backward probabilities are then used to compute a score for keyword verification and to locate the starting point of the potential keyword. The verification score helps to prevent false alarms associated with peaks in the a posteriori probability of the keyword endstate. It is similar to that used as a post-processor to a Viterbi search with partial traceback as described by Rose et al in the April 1990 paper. However, it is computationally more efficient in that backtracking is only required when a keyword is hypothesized. The forward-backward search is described in more detail below.

In accordance with one aspect of the present invention, the technique uses an HMM for non-keyword, or background, speech in order to normalize the probabilities used for word spotting. This approach in combination with other features described below should result in a high probability of spotting a word in the recording media after the speaker has repeated it only once. However, should the system fail to find the word, in accordance with another aspect of the invention, a second spoken repetition of the word could be used to update or refine the original word model created, for example, using well-known Baum-Welch training.

In accordance with a preferred embodiment of the invention, a vector quantization codebook is preferably created from analysis of one or more minutes or recorded speech of the desired speaker. This codebook can be created from the recorded speech for which indexing is desired, or from other samples of recorded speech from the same talker. This codebook consists not only of the centroids, or means of the data associated with each codeword, but of the covariance matrices. The codebook is preferably created using the known fuzzy c-means clustering technique, which approximates the maximum likelihood estimates for the means and covariance matrices of each codeword under the assumption that the data consists of a mixture of Gaussians. Other ways of creating the codebook could also be used.

A hidden Markov model (HMM) for the spoken word to be located is created as follows. The spoken word is quantized according to the codebook previously created. Each unique codeword in the quantization sequence determines a state in the HMM. The output distribution for that state is Gaussian, with the mean and covariance matrix associated with the codeword. The transition probabilities for the model states are trained using the known Baum-Welch algorithm on the same training utterance.

The HMM for non-keyword speech is created in order to normalize probabilities used for word spotting. This model is created by letting each codeword represent a state, with an associated Gaussian output distribution as described above, and permitting transitions between all states. Alterratively, transitions between states can be weighted by bigram probabilities (i.e., the transition probabilities between codewords) determined from the data used to create the codebook.

In executing the process of the invention, the location of a word is hypothesized when the a posteriori probability of the final state in the HMM for the word to be located exceeds a threshold. This threshold can be varied depending on the importance of missing the location of the spotted word relative to finding false occurrences of the word.

Another way of viewing the distinctions between the present invention and that of the prior art is to compare the teaching of the invention with that described in the previously cited April 1990 Rose paper.

In the Rose method, dynamic programming is used to find possible start and end points for keywords. Typically, dynamic programming works by computing in a forward pass the probability of being in each state at each time frame. The most likely state sequence is then determined in a backward pass, which begins when the entire forward pass is complete. The most likely state sequence determines keyword endpoints as the time intervals where the most likely state sequence consisted of keyword states. Rose has used a modification of dynamic programming, which does continual backtracking, as opposed to waiting until the end of the utterance to backtrack. While this alleviates the delay to some extent, the continual backtrack (known as partial backtrace, see Brown et al., Proc. of the Int. Conf. of Acoustics, Speech and Signal Processing, Paris, France, May 1982, pp. 1629-1632), is computationally demanding. Once the keyword endpoints are determined, an additional computation is required to compute the score.

In contrast, the system of the invention does backtracking only when a keyword endpoint is hypothesized. Furthermore, the score is computed during the backtracking, making extra computation unnecessary.

Thus, in the inventive system, during the forward search, as soon as a peak in probabilities is found representing a hypothesized end point of the keyword, backtracking is started immediately. In the typical forward search, not only will the correct word show up but also a number of incorrect words. For example, if the recorded utterance included the following words: "fee" and "tree"; and the keyword was "tree", it is likely that peaks in the a posteriori probability of the end state of the keyword "tree" would occur following "fee" as well as "tree" in the recorded utterance. Assuming these peaks exceeded the preset threshold, the backward search would be initiated following each word to determine its start and to compute a score. Presumably, the score for "fee" would be lower than that for "tree" due to differences in the initial portions of the words, and this score could be used to reject the false keyword "fee".

It is important to note that the background HMM is created not as HMMs for words, but rather as HMM models for sounds. We prefer to call them "acoustic units", since they are different than the phonetic units "phonemes" used by linguists.

As will be explained later, the system works better for spotting multi-syllable words than for single syllable words.

It is possible to locate a keyword spoken by a user in previously recorded speech from a different talker using these techniques with the following modifications. The codebook for the talker of the recorded speech can be created as before. But a mapping between this codebook and the speech of the user must be established. This is done by obtaining a segment (one of more minutes) of training speech from the user, and using the known techniques described in Furui, S. Furui, "Unsupervised Speaker Adaptation Method Based on Hierarchical Clustering", ICASSP, Glasgow, Scotland, May 1989, pp. 286-289, to provide the desired mapping.

An important application for the wordspotting system of the invention is not only indexing of recorded speech, but especially for interactive voice editing of recorded speech, such as voice mail, dictation, or audio documentation. Wordspotting can be employed by the user to enable editing operations by locating specific words in the recorded speech for deletion, substitution, or insertion. It will also enable efficient and automatic means of indexing into long audio documents. The system, while restricted to a single speaker, or pairs of speakers is not restricted in vocabulary size.

Examples of how the wordspotting system of the invention would actually be carried out in practice will be better understood from the detailed description that follows taken in conjunction with the accompanying drawings.

SUMMARY OF DRAWINGS

In the drawings:

FIG. 5 illustrates a typical clustering distribution;

FIG. 6 shows a typical parallel network of an HMM;

FIG. 7 is an illustrative quantization sequence for a sample keyword, and FIG. 8 is a typical HMM for that keyword;

FIG. 9 shows the merged HMM for typical keyword and non-keyword speech;

FIGS. 10-12 illustrate various aspects of the invention implemented with several similar sample keywords;

DETAILED DESCRIPTION OF PREFERRED EMBODIMENTS

Training typically requires two stages. The first is a static stage in which statistics for a given talker are learned and a model for the background speech is obtained (see the Rose et al, April 1990 paper listed above). The second stage is a dynamic stage in which keyword training is performed while the system is in use.

In the first stage of training the wordspotting system, the statistics for the output distributions of the HMM's are learned. These statistics are then used in creating a background model for the talker's speech. Training data for this stage consists of an arbitrary segment of the talker's speech. All states of the hidden Markov models in both the background HMM and the keyword HMM are assumed to have Gaussian output distributions. The statistics of the Gaussian distributions are learned by using fuzzy c-means clustering, as described in J. C. Bezdek, J. C. Dunn, "Optimal Fuzzy Partitions: A Heuristic for Estimating the Parameters in a Mixture of Normal Distributions". IEEE Trans. on Computers, August 1975, pp. 835-838; and R. O. Duda, P. E. Hart, Pattern Classification and Scene Analysis, John Wiley and Sons, Inc., New York, 1973, on the training data to estimate the parameters of a mixture of Gaussians. Ordinary k-means can also be used. Each cluster is characterized by a Gaussian distribution, whose mean is the cluster center, and a covariance matrix. The clustering algorithm is similar to the standard vector quantization clustering algorithm (see, for example, R. M. Gray, "Vector Quantization", IEEE ASSP Magazine, April 1984, pp. 4-29) except that the statistics of the cluster are updated by samples weighted by the probability of the sample being in that cluster. These probabilities are obtained by assuming a Gaussian distribution. The fuzzy clustering for learning means and covariance matrices tends to help when the amount of data available for clustering is limited. This is further explained below.

Figure 1A:
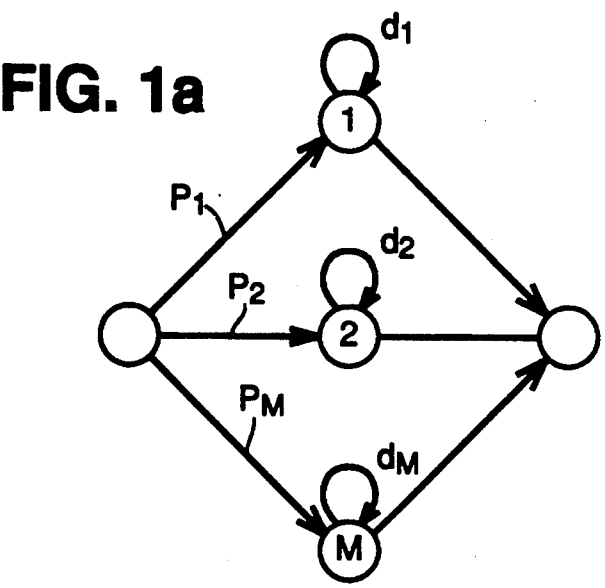
FIG. 1a is a typical background HMM.

The background HMM is formed by a parallel connection of states, with one state for each Gaussian distribution. FIG. 1a shows a typical background model. There are transitions from an initial null state at the left to each of the M Gaussian output generating states. The transition probability pi corresponds to the prior probability of state i. The self transition probability di models the duration of state i. Transition probabilities are trained on the same data used for clustering with the standard Baum-Welch training algorithm, as described in detail in L. R. Rabiner, "A Tutorial on Hidden Markov Models and Selected Applications in Speech Recognition". Proc. of the IEEE, Vol. 77, No. 2, February 1989, pp. 257-285, whose contents are herein incorporated by reference. The Gaussian output statistics are not updated during this training.

Other background HMMs are possible. For example, a bigram network (see, for example, Kai-Fu Lee Phd Thesis 1988, Carnegie Mellon, Large-Vocabulary Speaker-Independent Continuous Speech Recognition: The SPHINX System) could be created from the states and trained similarly.

Figure 1B:
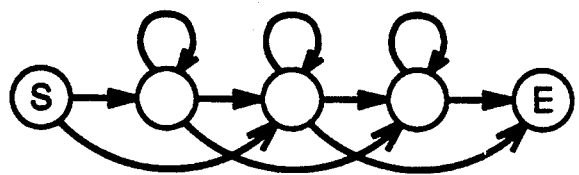
FIG. 1b is a typical keyword HMM.

In the second stage of training, an HMM for the keyword is created from a single repetition of the keyword by making use of the information about the Gaussian output distributions obtained from clustering. The states for the keyword HMM are obtained by vector quantizing the training utterance similarly to what is described by Bahl et al in their April 1988 paper. Adjacent frames corresponding to the same cluster, or Gaussian output distribution, are collapsed. FIG. 1b shows a typical keyword HMM. We assume a left-to-right Bakis model as described in F. Jelinek, "Continuous Speech Recognition by Statistical Methods". Proc. of the IEEE, Vol. 64, No. 4, April 1976, pp. 532-556, so that each state has a self transition, and transitions to the next 2 following states. The keyword HMM is then retrained using the same utterance. In this case, transition probabilities as well as means for the Gaussian output distributions are updated during Baum-Welch training. Covariance matrices are not updated due to the limited amount of data provided by the single utterance.

Figure 1C:
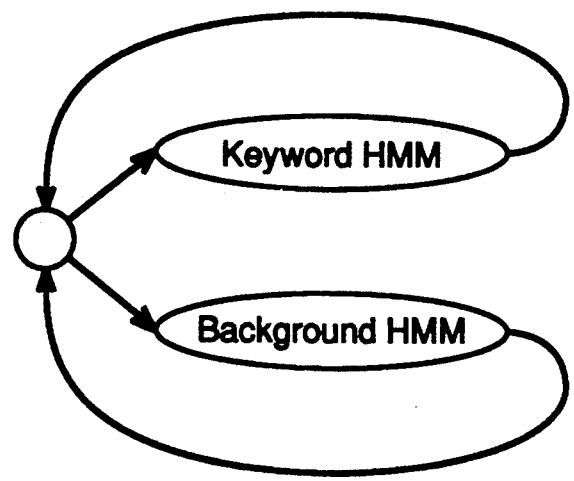
FIG. 1c is a typical HMM network used for spotting keywords in accordance with the invention.

The HMM network used for spotting keywords in accordance with the invention is a parallel connection of the background HMM and keyword HMM as shown in FIG. 1c. The search technique uses a forward search through the network to hypothesize keyword and locations, followed by an immediate backward search through each network separately for keyword verification and start location. The forward search looks for peaks in the a posteriori probability of the end state of the keyword and is identical to that described in the Rohlicek et al May 1989 paper. The standard Baum-Welch (see the February 1989 Rabiner Tutorial) forward probabilities $a_t(i)$ are computed time synchronously and are used to compute the a posteriori probability of the end state e of the keyword at time t as $$P(S_t = e | X_1 \ldots X_t) = a_t(i) / \sum_j a_t(j) \qquad (1)$$

where $S_t$ is the state at time t and $X_t$ is the output at time t. A known peak detector is then used to locate peaks in the a posteriori probability which might correspond to the end of the hypothesized keyword.

The backward search is immediately initiated at a time $t_e$ for which the forward search has detected a peak in the keyword end state probability. Likelihoods for the keyword HMM and background HMM are computed separately, using the standard Baum-Welch backward probabilities, or $b_t(j)$. Thus two sets of backward probabilities are computed: one for the keyword HMM and one for the background HMM. These probabilities are computed backwards recursively starting from the hypothesized end $t_e$.

The duration normalized likelihood for the keyword starting at time t and ending at time $t_e$ is $$L^{key}(t,t_e) = P(X_t, \ldots X_{t_e}|\text{keyword})^{1/(t_e-t)} = b_t(s)^{1/(t_e-t)} \quad (2)$$

where s is the start state of the keyword. A duration normalized background likelihood $L^{back}(t,t_e)$ is computed similarly. A score for the keyword from a potential start time t to the hypothesized end time $t_e$ is the ratio of the duration normalized keyword likelihood to the sum of the duration normalized keyword and background likelihoods, $$S(t,t_e) = L^{key}/(L^{key} + L^{back}). \quad (3)$$

This is similar to the scoring used in Rose et al's April 1990 paper for post processing keyword segments found by dynamic programming.

The start time $t_s$ for the keyword is chosen to maximize the score $S(t,t_e)$. We assume the duration of the keyword is between 0.5 and 1.5 times that of the training utterance, so that if N is the duration of the keyword training utterance the start time is obtained as $$t_s = \arg\max_{t_e - 1.5N < t < t_e - .5N} S(t, t_e) \quad (4)$$

Figure 2:
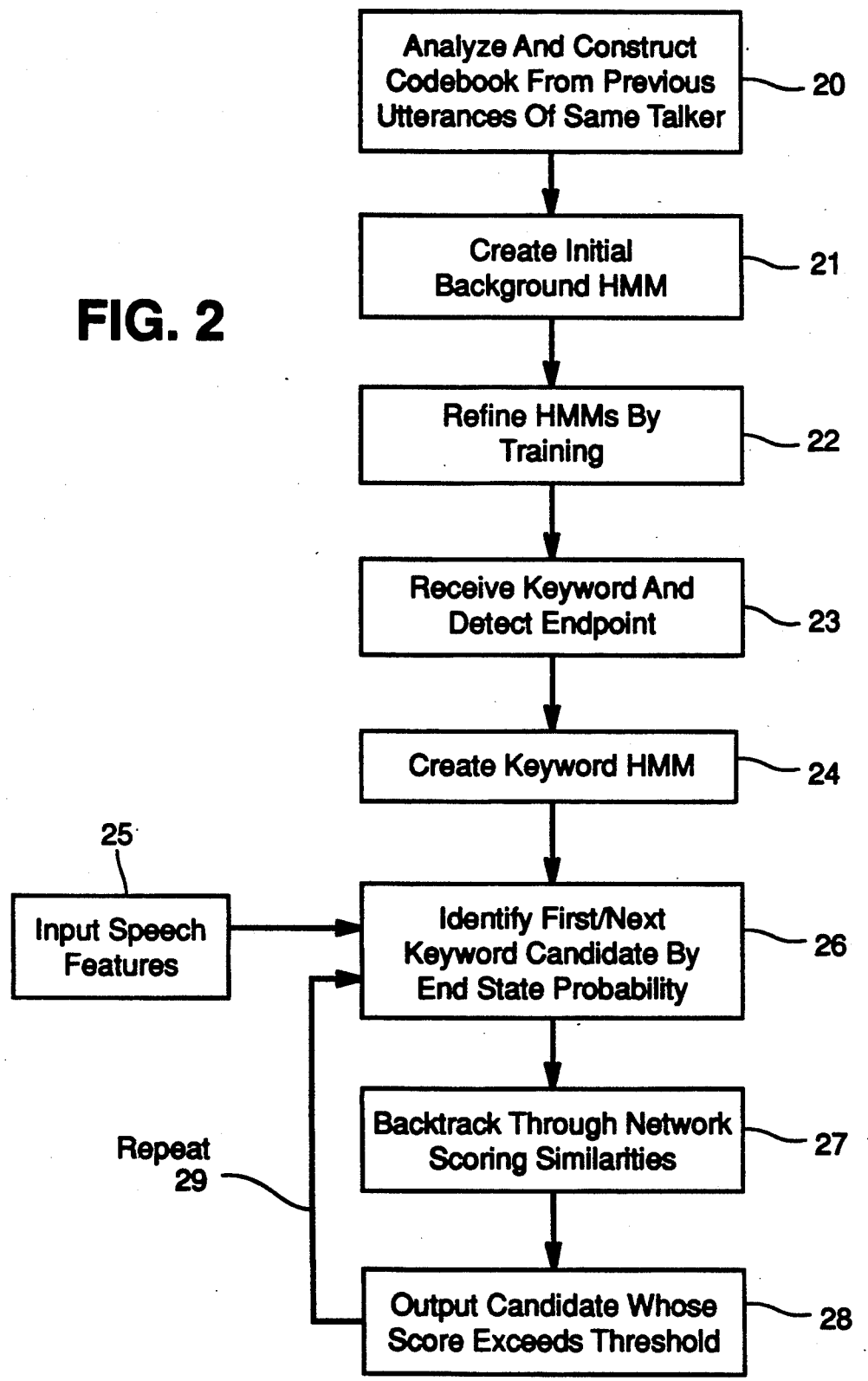
FIGS. 2-4 illustrate several algorithms used to carry out the invention.
Figure 3:
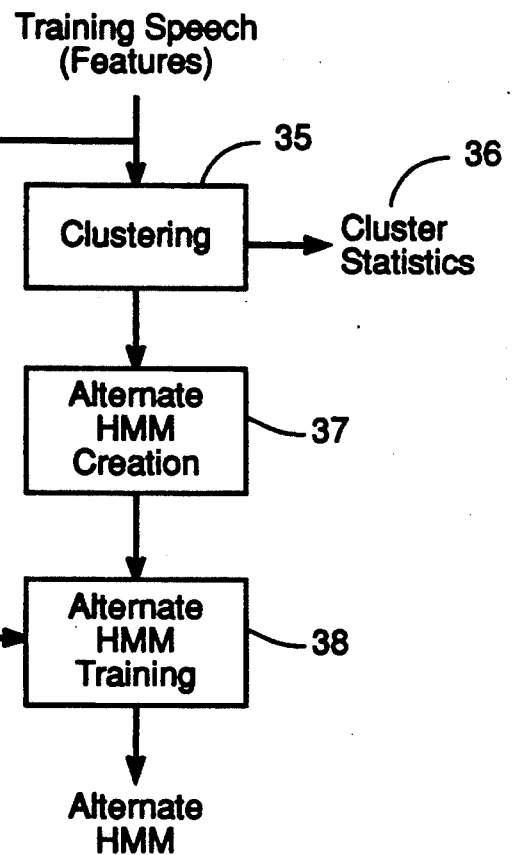
Figure 4:
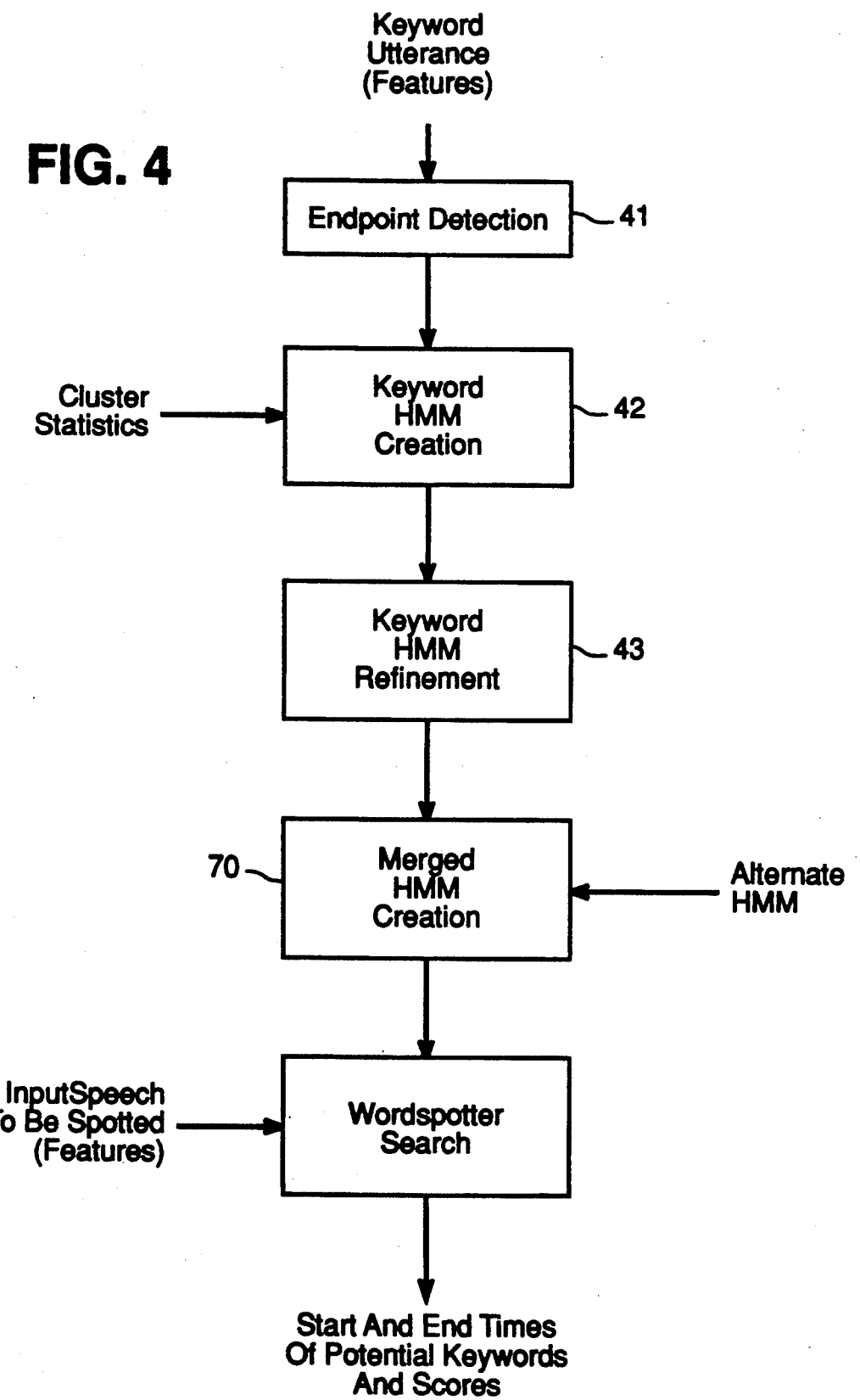

The following example will serve to illustrate the training and operation of the wordspotting system of the invention. ng Several general algorithms are illustrated in FIGS. 2-4, and will be referenced in the description that follows.

In general, in the FIG. 2 algorithm, previous utterances of the same talker are analyzed and a vector quantized codebook created at 20. From this at 21 can be created an HMM representing non-keyword speech as a sequence of acoustic units, one per codeword. This is refined and updated as described above at 22. At 23 a conventional endpoint detector is employed to detect the spoken keyword endpoints. Basically, the endpoint detector is deleting silences at the beginning and end of the keyword utterance.

At 24, a similar process is used for creating a HMM for the keyword to be spotted. Once the keyword HMM is made and the combined keyword and non-keyword speech HMM is created, the forward pass is initiated through the recorded utterance to hypothesize candidate endpoints in the utterance stream matching that of the keyword. This is used to sort out the possible candidates from the input recorded speech at 25 which is inputted to block 26. When a peak is detected, indicating a possible candidate, backtracking 27 through the network of FIG. 1c takes place, meanwhile scoring the degree of similarity as previously described. If the preset score is exceeded, the candidate and/or its location is outputted or otherwise indicated at 28, and the process repeats via branch 29 for the next possible keyword candidate.

In more detail, the speech is first digitized and feature vectors are computed at regular intervals. For example, speech can be digitized by sampling at 8000 samples per second, and features consisting of 12 cepstral coefficients can be computed every 10 milliseconds. (The cepstral coefficients are a way of characterizing the short-time spectrum. Other spectral estimates are possible, for example a DFT could be used). This uses standard, well-known techniques.

An arbitrary segment of the user's speech is required for training (for example 1 or 2 minutes). See also FIG. 3. Feature extraction is performed, resulting in a sequence of feature vectors. During training, these feature vectors are clustered at block 35 using a variant of the known k-means clustering algorithm. The result of clustering is a set of M clusters 36 (for example 64). Associated with each cluster is the mean and covariance matrix of samples within that cluster. FIG. 5 illustrates a set of 8 clusters which might be obtained from 2-dimensional features.

The background, or non-keyword hidden Markov model (HMM) is formed at block 37 based on the above clusters as follows. First, each cluster is associated with a state in the alternate HMM, and the output distribution for that state is Gaussian, with mean and covariance matrix of the associated cluster. The output producing states are put into a parallel network, as shown in FIG. 6 at 49. An initial null state 50 is created, with transitions to each of the output producing states. The associated transition probabilities correspond to the prior probabilities of the clusters. The output states have self transitions, modeling the duration of each cluster. The transition probabilities are learned by using the standard Baum-Welch training procedure for HMM's on the training data as described in the referenced papers. A bigram alternate HMM can be created similarly.

Once the system is trained 38, and the alternate or background HMM created, spotting is performed by speaking the keyword to be spotted. See FIG. 4. An HMM for the keyword is created as follows. First the endpoint 41 of the keyword is determined using a standard endpoint detection algorithm, and feature extraction is performed. Then each feature vector is quantized by labelling it according to the nearest cluster, where the nearest cluster is the most probable cluster to have generated the feature vector as computed by the Gaussian distribution, indicated in block 42. Block 43 signifies a training or refining of the keyword HMM. In the single speaker case, the keyword HMM is refined by using Baum Welch training to update both the transition probabilities and mean vectors for the output distributions. It is also possible to update with additional training vectors: for example if the system missed a keyword after the first repetition. In the case of two speakers, only the transition probabilities are updated.

FIG. 7 shows an idealized quantization of a sequence of feature vectors which might correspond to the keyword "tree". The HMM for the keyword is obtained by creating a state (labelled "4", "3", "6") for each unique quantization cluster. FIG. 8 shows the HMM 60 which would be created for the quantization sequence in FIG. 7. Each state has a self transition 61, a transition 62 to the next state, and a transition 63 which skips a state. Null initial and final nodes, labeled "S" and "E", are added for convenience. Finally, standard Baum-Welch training is performed to estimate the transition probabilities and update the mean vectors of the Gaussians for each state, where the same utterance of the keyword is used for training.

The keyword HMM is then merged 70 in FIG. 4 with the non-keyword or alternate HMM, which was learned from previous training as shown in FIG. 3. The merged network is illustrated in FIG. 1c and FIG. 9. Feature vectors are computed for the input speech in which the keyword is to be spotted. The merged network designated 80 in FIG. 9 is used to find probable locations of the keyword in the input speech by computing for each successive feature vector the a posteriori probability of being in the keyword endstate "E". Peaks in the a posteriori probability indicate probable locations for the potential keyword endpoints. FIG. 10 shows a quantization of the input speech which contains the word "fee" and the keyword "tree", with the numerals 1 ... 7 representing the various quantization levels. FIG. 11 shows peaks in the computed a posteriori probability. Note that there is a peak in the end state probability for the word "fee" as well as for the word "tree". There would be no peaks for input speech words whose sounds bear little resemblance to that of the keyword. As indicated in FIG. 11, while the recorded utterance appears to the computer as a stream of symbols representing the quantization, note that what causes the peaks at the reference numerals 82, 83 is the similarities of the speech to that of the keyword indicated in FIG. 8.

Each time a peak in the endstate probability is detected, for example, at locations 82 and 83, in accordance with the invention, a backward search is initiated to locate a possible start time for the keyword and to compute a score. The score is a measure of how well the keyword HMM fits the data for the proposed start and end times relative to how well the alternate HMM fits the data. Scores are computed for each feature vector starting from the proposed endpoint and continuing back through 1.5 times the length of the keyword repetition used to generate the keyword HMM. The time where the keyword score is maximum, indicated by reference numerals 84, 85, is the start point of the keyword. FIG. 12 shows the backward search for the potential endpoints from FIG. 11. The score for the portion of the speech corresponding to "fee" was 60, while the score for the keyword "tree" was 90, for the illustrative example.

The score associated with the start and end times of the keyword can be used to control the probability of correct keyword detection to false alarm rate. A higher threshold would lower the false alarm rate, but might possibly lower the keyword detection probability, while a lower threshold would increase probability of detection while also increasing the false alarm rate. For example, a threshold of 50 would result in the words "fee" and "tree" being detected as keywords, whereas a threshold of 95 would result in the keyword "tree" being missed. A threshold of 75 would correctly accept the keyword "tree" and reject the false alarm "fee". The threshold which can be selected by the user is likely to be task dependent, and can be adjusted by the user to optimize performance of the system.

When a keyword has been detected and outputted or its location indicated by the system, then the system automatically proceeds to the next instance of recorded speech at 71 and the algorithm of FIG. 2 starting at block 26 repeated until all matching keywords and their locations have been outputted.

The wordspotting technique as described herein was tested on six speakers from the speaker-dependent training portion of the DARPA Resource Management Database (see P. Price, W. M. Fisher, J. Bernstein, D. S. Pallett, "The DARPA 1000-Word Resource Management Database for Continuous Speech Recognition". Proc. of the Int. Conf. on Acoustics, Speech and Signal Processing, New York, N.Y., April 1988, pp. 651-654). The database consists of sentences from a 1000-word naval resource management task. A set of 25 keywords was selected from ship names in the vocabulary. The data was downsampled to 8 KHz. A vector of 12 cepstral coefficients was computed on the pre-emphasized data every 10 milliseconds.

Background models for each of the speakers were obtained using the 10 rapid adaptation sentences for training. Wordspotting was performed on the 600 speaker-dependent training sentences. One repetition of each keyword was extracted manually for keyword training. Except for this labeling, only orthographic transcription of the sentences was available. Therefore, a keyword was assumed to have been detected correctly if it was detected in a sentence known to contain the keyword.

Figure 13:
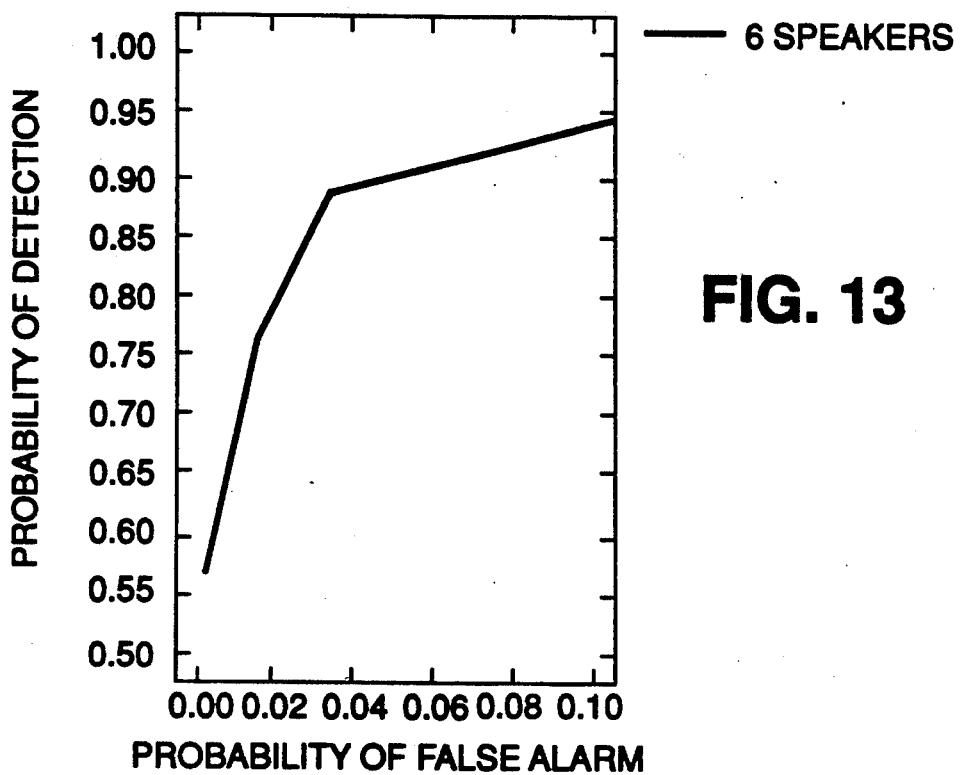
FIGS. 13 and 14 show the results of actually using the inventive method for wordspotting.

FIG. 13 shows a plot of the probability of detecting a keyword that actually occurred in a sentence as a function of the probability of detecting a keyword in a sentence when none was present. This curve was obtained by varying a threshold on the keyword score of equation 3. It represents average performance over the 6 talkers. The probability of correct keyword detection is 0.94 when the probability of a false alarm in a sentence is 0.1.

These statistics are based on per-sentence performance due to the nature of the database. Other systems report probability of detection as a function of false alarms per keyword per hour (see, for example, J. G. Wilpon, L. G. Miller, P. Modi, "Improvements and Applications for Key Word Recognition Using Hidden Markov Modeling Techniques". Proc. of the Int. Conf. on Acoustics, Speech and Signal Processing, Toronto, Canada, May 1991, pp. 309-312). Since sentences vary between three and five seconds, an approximate conversion to false alarms per keyword per hour can be obtained by multiplying the false alarm per sentence results by 900. For example, a probability of correct keyword detection of 0.76 is obtained at a false alarm rate of fourteen false alarms per keyword per hour.

Figure 14:
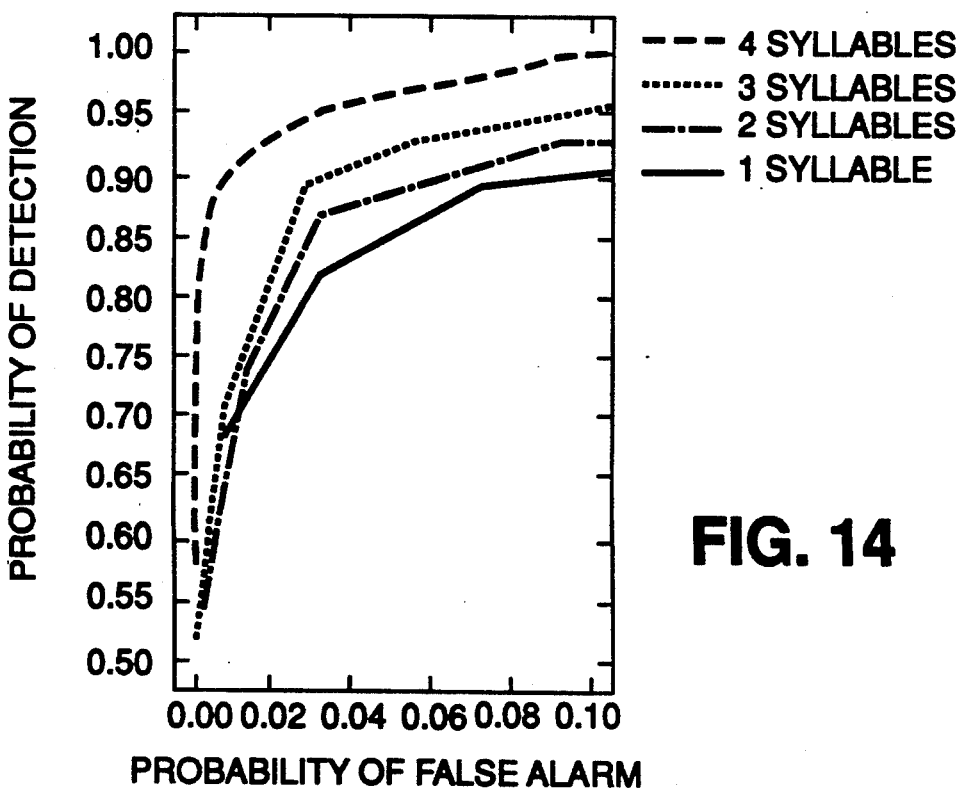

The performance of the system as a function of the number of syllables in the keyword was also examined. FIG. 14 shows the results when the number of syllables per word is 1,2,3 and 4 or more. The plot shows that the probability of detection increases with the number of syllables in the keyword. Also, for the same probability of detection, the false alarm rate decreases as the number of syllables increases. Thus for a probability of detection of 0.9, words with 4 or more syllables have a probability of false alarm of 0.01 per sentence, while for 2 syllable words the false alarm probability increases to 0.06.

A wordspotting system intended for use in voice editing and indexing has been demonstrated and evaluated. Key features of the system are ease of training, arbitrary keyword vocabularies, an efficient method for keyword endpoint location and verification, and the use primarily of a single utterance of the keyword during operation of the system.

The experimental data show that better keyword detection and lower false alarm rates are obtained using keywords with more syllables. In voice editing and indexing applications, there are relatively few restrictions on the keyword vocabulary. This suggests that users could optimize system performance by using phrases rather than single words for editing and indexing applications.

Figure 15:
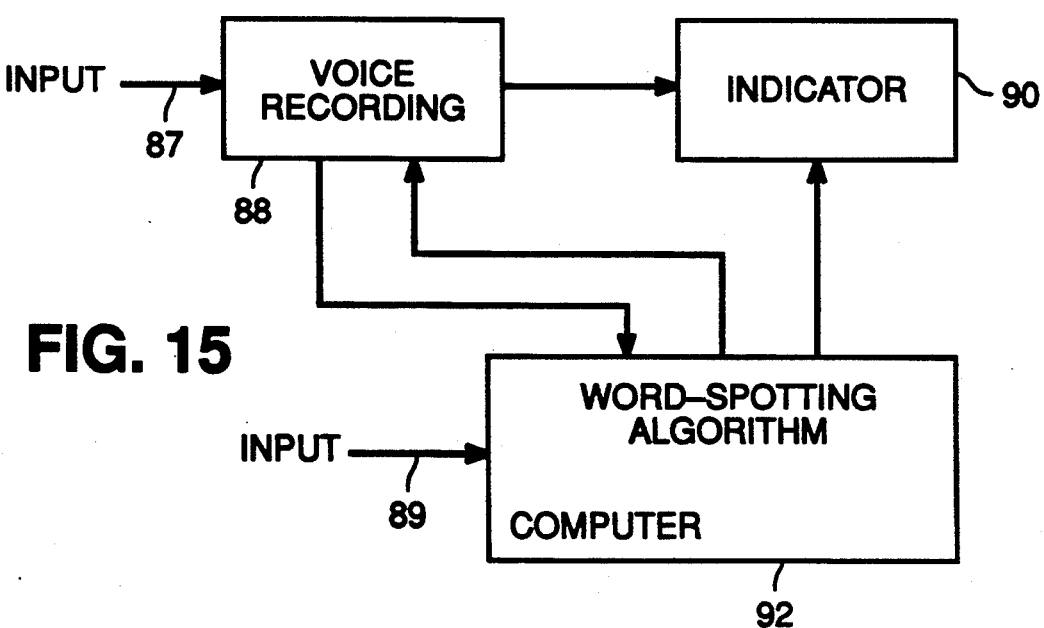
FIG. 15 is a schematic block diagram to illustrate wordspotting in a voice editing application.

FIG. 15 is a schematic block diagram to indicate use of the wordspotting invention for voice editing. Suppose a user has input at 87 to some kind of conventional voice recording apparatus 88 a dictated voice message. After finishing, the user recognizes that an error was made in the message, say an erroneous proposed meeting time or place. Without having to go through a playback of the complete recording to find the error, the user now inputs at 89 to a computer 92 the erroneous word or phrase, i.e., the keyword. The computer now proceeds to process the information as previously described and ultimately locates acoustic units which score above the pre-set threshold. At that point, the computer can indicate on a conventional indicator 90, such as a display, the location of the spotted word or phrase or position the voice recording to a location in the vicinity of the spotted word or phrase, allowing the user by appropriate commands to delete, edit, or replace previously recorded messages. That the system will operate nearly always with only a single spoken utterance of the keyword, makes the invention especially valuable for voice-editing applications.

A specific form of indication to the user is not part of our invention, but any known techniques are obviously applicable. For example, as the input speech is being scanned for keywords, the sound waveform of the utterance can be displayed and scrolls along the screen during the scanning process, with a spotted keyword highlighted in the same manner that word finders highlight text in word-processed documents. An alternative to highlighting the keyword would be to have cursors indicating the beginning and end of the keyword, as are available in sound editing equipment. In cases where the actual display of the speech waveform is not required, the system could keep a list of start and end times for the keyword, so that these known portions of the utterance could be accessed at random.

The computer 92 must already have stored in its system a sample of speech from the speaker of the recorded utterance, from which the background HMM can be constructed. Alternatively, the computer can be readily programmed to procure a sample from the actual voice recording itself.

For best results, the voice used in making the recording should be the same as that of the user doing the wordspotting. But, in principle, this, while preferred, is not essential. If a different voice speaks the keyword, provided that feature vectors of the recorded voice were properly mapped to that of the user's voice, then the system could still spot the keyword sought, but performance likely would be poorer. A technique for mapping codebooks is given in the previously referenced Furui paper.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A wordspotting method for determining the location of a word in recorded continuous voice-speech using a single spoken version of the word as a keyword, comprising:
    (a) creating a first hidden Markov model (HMM) representing features of the voice that recorded the speech,
    (b) providing the keyword,
    (c) creating a second hidden Markov model (HMM) representing features of the keyword to be spotted, said first and second HMMs comprising a sequence of states each having an output representative of an acoustic unit and transition probabilities to succeeding states and having a normalized forward probability for each state and having an endstate for the keyword,
    (d) using the first and second HMMs, scanning through the recorded speech computing the normalized forward probability for each state searching for a peak in the a posteriori probability of the endstate of the keyword thus hypothesizing that the end time of a keyword has been found,
    (e) if a peak is found in step (d), stopping the scanning and backtracking through the recorded speech to the most probable hypothesized keyword beginning time while computing a score for that hypothesized keyword, where the score represents a measure of how well the second HMM representing background speech fits the hypothesized keyword beginning and end times relative to how well the first HMM fits the said beginning and end times,
    (f) indicating the keyword has been spotted in the recorded speech when the score computed in step (e) exceeds a pre-set value.

2. The method of claim 1, wherein steps (d)–(f) are repeated until the recorded speech finishes.

3. The method of claim 1, wherein the keyword has plural syllables.

4. The method of claim 1, wherein the first HMM is formed by a parallel connection of states.

5. The method of claim 4, wherein the second HMM is formed by a left to right model wherein each state has a self transition and transitions to the next two following states.

6. The method of claim 1, wherein step (d) includes the steps of forming a network made up of a parallel connection of the first HMM and the second HMM, and conducting a forward search through the network to hypothesize keyword endstates.

7. The method of claim 6, wherein step (e) includes the step of conducting a backward search separately through each of the first and second HMMs.

8. The method of claim 1, wherein step (d) includes the step of inputting the recorded speech and searching for locations in the recorded speech where the end of a candidate keyword is probable, where such locations are determined by peaks of sufficient amplitude in the a posteriori probability that the endstate of the second HMM has been found.

9. A wordspotting method for determining the location of a word in recorded continuous voiced-speech using a single spoken version of the word as a keyword, comprising:
    (a) creating as background a first hidden Markov model (HMM) representing features of the voice that recorded the speech, said first HMM being formed by a parallel connection of states and having a duration normalized likelihood,
    (b) providing a spoken keyword,
    (c) creating a second hidden Markov model (HMM) representing features of the spoken keyword to be spotted and having a duration normalized likelihood, said first and second HMMs comprising a sequence of states each having an output representative of an acoustic unit and forward transition probabilities to succeeding states,
    (d) computing feature vectors for the recorded continuous speech, (e) using the first and second HMMs, scanning through the recorded speech and computing for each feature vector determined in step (d) its normalized forward probability of being in the keyword endstate to search for a peak in said forward probability for hypothesizing that a keyword has been found, (f) if a peak is found in step (e), stopping the scanning and backtracking through the recorded speech looking for the hypothesized keyword beginning time while computing a score for that hypothesized keyword, where the score represents a ratio of the duration normalized keyword likelihood to the sum of the duration normalized keyword and background likelihoods, (g) indicating the keyword has been spotted in the recorded speech when the score computed in step (f) exceeds a pre-set value.

10. The method of claim 9, wherein the indication of step (g) is carried out on a display of the recorded utterance.

11. The method of claim 9, wherein the indication of step (g) is carried out by stopping the recorded utterance where the word has been found.

12. The method of claim 9, wherein the HMMs are formed by digitizing, dividing words into frames, deriving feature vectors for each frame, weighting the feature vectors, concatenating the weighted feature vectors to form the HMMs.

13. The method of claim 9, wherein steps (e)–(g) are repeated until the recorded speech finishes.

14. The method of claim 9, wherein step (f) includes the step of computing for each feature vector determined in step (d) starting from the determined endtime and continuing back through 1.5 times the length of the spoken keyword used to generate the second HMM, the time where the keyword computation is maximum being used as the keyword beginning time.

15. The method of claim 9, wherein the second HMM is formed by a left to right model wherein each state has a self transition and transitions to the next two following states, and step (e) includes the step of forming a network made up of a parallel connection of the first HMM and the second HMM.

16. The method of claim 9, wherein step (a) includes the step of analyzing previous utterances of the same talker and creating a vector quantized codebook in which each codeword in the quantization sequence represents a state in an HMM.

17. The method of claim 16, wherein step (c) includes the step of using the vectorized quantized codebook to create the second HMM.

18. The method of claim 9, further comprising the step of varying the pre-set value to vary the number of indications that a keyword has been spotted when step (g) is carried out.

19. The method of claim 9, wherein step (a) includes the step of creating a mapping of feature vectors of the voice that recorded the speech to feature vectors of the spoken keyword for use in step (c) in creating the second HMM. s

* * * * *